Figure 1:
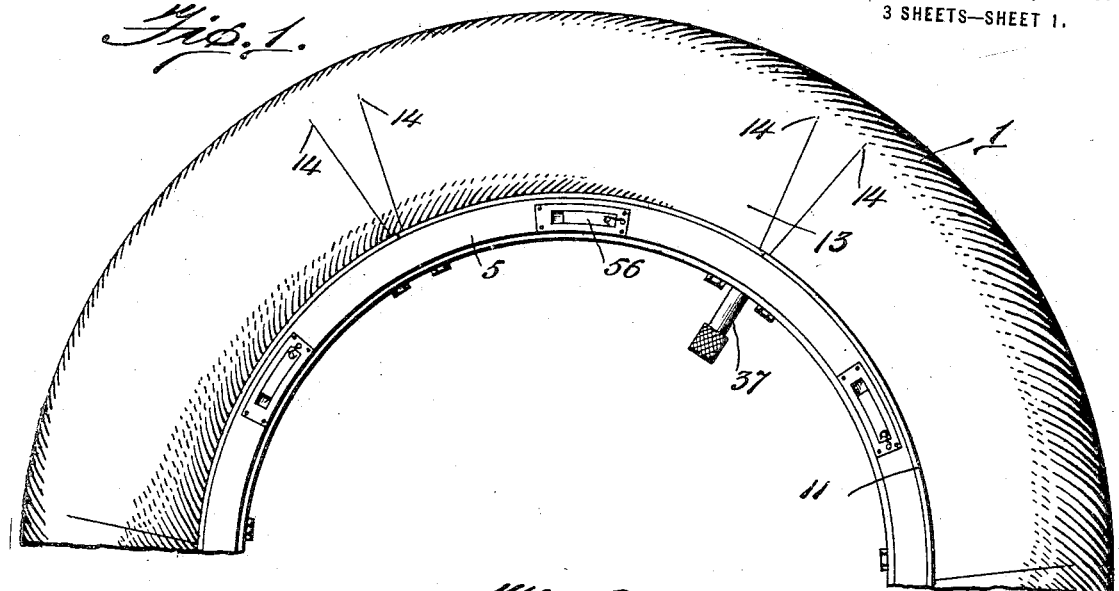

W. E. PERRYCLEAR.
SECTIONAL TIRE.
APPLICATION FILED MAY 26, 1917.

1,288,161.

Patented Dec. 17, 1918.
3 SHEETS—SHEET 1.

Witnesses

Inventor
William Eaton Perryclear
By Lowell & Lowell
Attorney

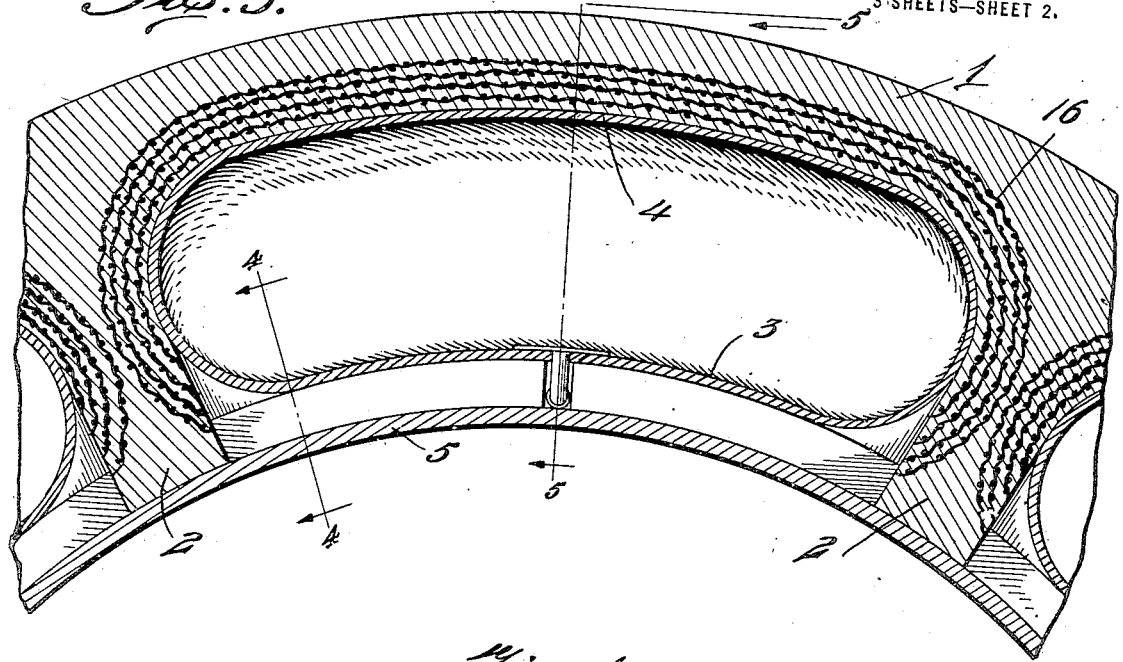
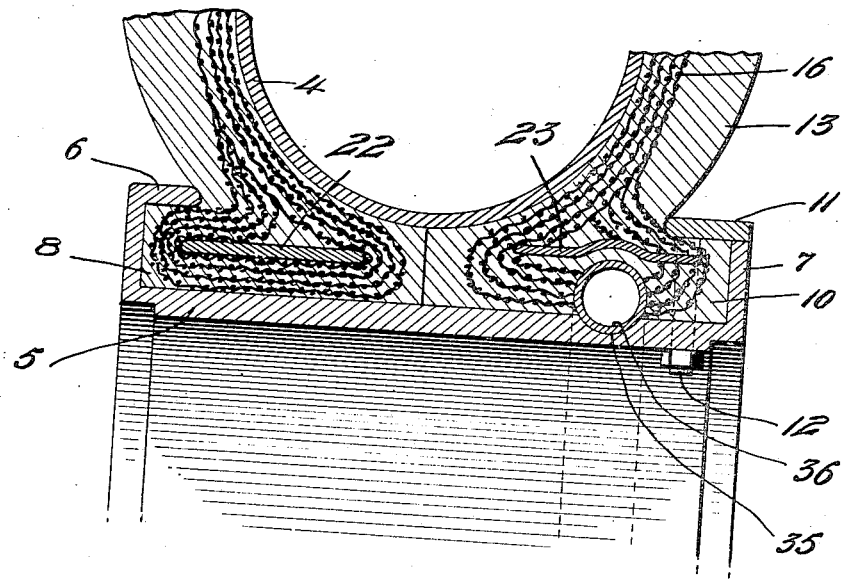

W. E. PERRYCLEAR.
SECTIONAL TIRE.
APPLICATION FILED MAY 26, 1917.
1,288,161.
Patented Dec. 17, 1918.
3 SHEETS—SHEET 3.
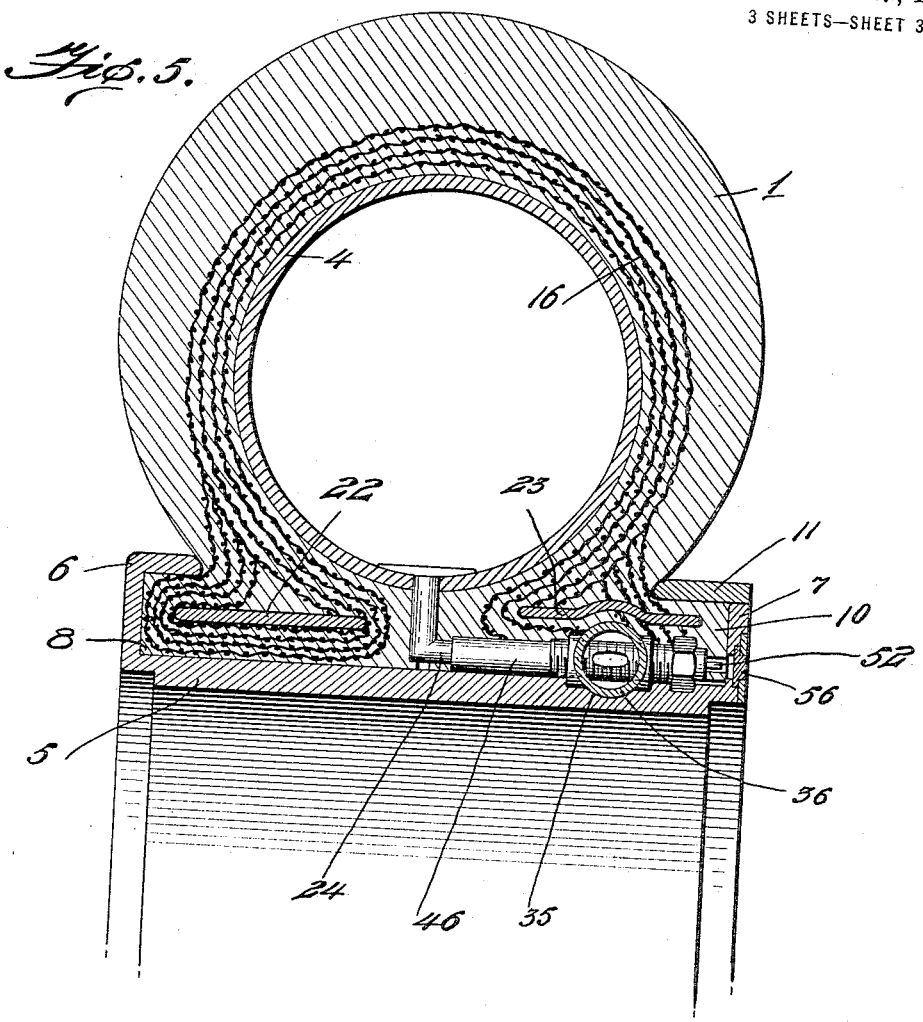
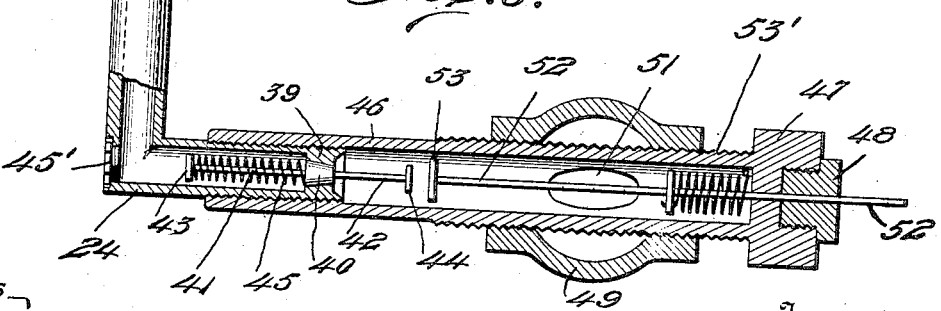
Witnesses
B. M. Offutt
Inventor
William Eaton Perryclear
By
Lowell & Lowell
Attorney

UNITED STATES PATENT OFFICE.

WILLIAM EATON PERRYCLEAR, OF SAVANNAH, GEORGIA, ASSIGNOR OF ONE-HALF TO LUTHER WILSON HIGH, OF WILSON, NORTH CAROLINA.

SECTIONAL TIRE.

1,288,161.  Specification of Letters Patent.  Patented Dec. 17, 1918.

Application filed May 26, 1917. Serial No. 171,233.

*To all whom it may concern:*

Be it known that I, WILLIAM EATON PERRYCLEAR, a citizen of the United States, residing at Savannah, in the county of Chatham and State of Georgia, have invented certain new and useful Improvements in Sectional Tires; and I do hereby declare the following to be a full, clear, and exact description of the invention, such as will enable others skilled in the art to which it appertains to make and use the same.

My invention relates in general to vehicle tires, and more particularly to pneumatic tires for automobiles.

Pneumatic tires are recognized as affording the most perfect means for preventing the communication to the occupants of a vehicle of the jolts and jars to which wheels are subjected.

Difficulty has always been experienced in the use of tires having a continuous expansible inner tube, in that a puncture extending through the outer tube into the inner one affords speedy egress for the air confined therein. Consequently the tire soon flattens and is of very little use until the inner tube is replaced or repaired. The removing of an inner tube is attended with difficulty and consumes much time, and if it is repaired and replaced for use, its life is normally much shortened by the operation. To overcome this difficulty attendant upon the use of a continuous inner tube, I have devised a tube made up of sections which are constructed to be held in an outer casing in such manner as to be readily removable and when secured and connected up comprised a practically continuous inflated inner tube. If one of the sections is punctured, or for any reason leaks and therefore collapses, either wholly or partially, the remaining sections on either side thereof maintain their inflated condition and render the tube practically complete, and its use may be continued for a considerable period without removing the injured section. It is possible that several sections in my construction may be injured, and the remaining ones will render the tire firm enough for continued use.

A still further object of my invention is to provide a tire each section of which can be inflated up to the pressure of the others without affecting the same, and to provide a means for deflating each section independently.

Figure 2:
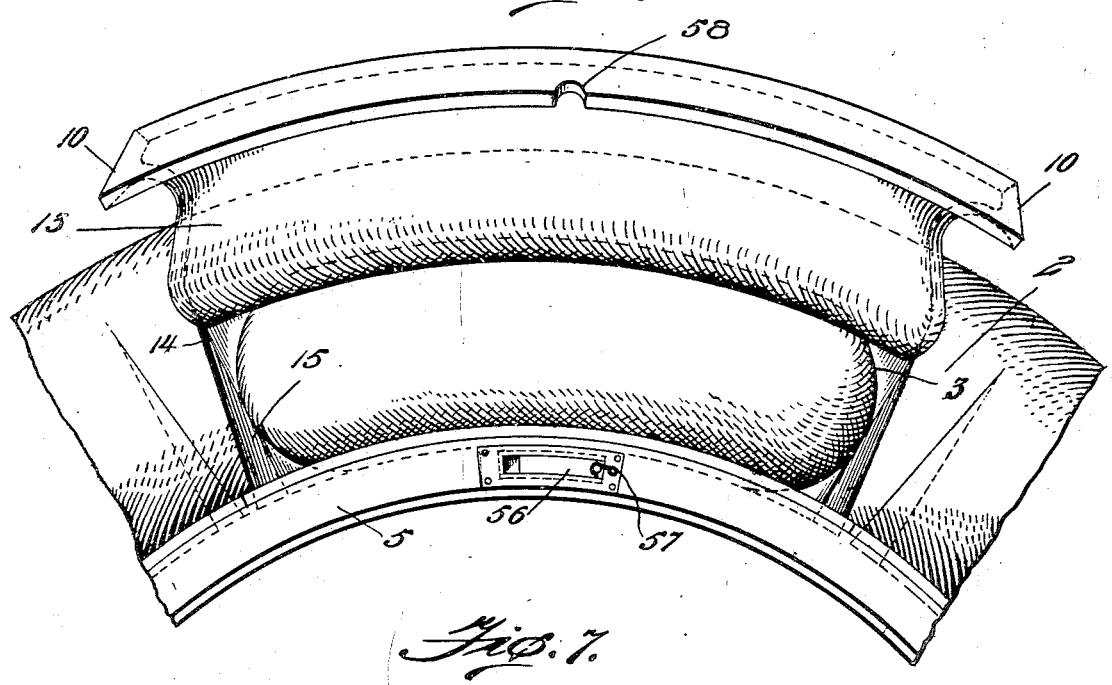

Other objects and the advantages resulting therefrom will be apparent from the following description in which reference is made to the accompanying drawings, forming a part of this specification and in which:

Figure 1 is a side perspective of the upper half of the improved tire;

Fig. 2 a view of one of the sectional casing flaps folded back and disclosing the inner tube;

Fig. 3 a sectional view circumferentially of one section showing the partition construction and valve;

Fig. 4 a section on line 4—4 of Fig. 3;

Fig. 5 a section on line 5—5 of Fig. 3;

Fig. 6 a detailed view of the valve mechanism and filling block; and

Figure 7:
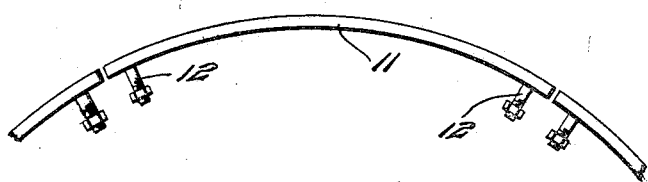

Fig. 7 is a detailed view of the clamps for the tire flanges.

Similar reference characters are used to designate similar parts in the several figures of the drawings.

Referring more particularly to the drawings, the tire proper consists of an outer casing 1, provided with any desired tread surface and provided circumferentially with alternate partition members 2 and recesses 3 for the reception of sectional inner-tubes 4. And this casing is adapted to be attached to a rim 5 preferably of the demountable type by means of the clamping members 6 and 7. On one side, the inwardly projecting clamp 6 engages over the flange or bead 8 on the casing, while on the opposite side the rim is left open at the top to receive the opposite base flange or bead 10 of the outer casing and which is adapted to be securely held in place by means of the sectional clamp bars 11, which are provided with suitable fastening means, such as the bolts 12 arranged in pairs at the partitions and passing through the clamping members into the rim, as shown in Fig. 4.

In practice there are approximately twelve of the inner tubes, but for convenience of illustration the tire is herein shown with but six.

In order to provide access to these inner tube sections, the outer casing is constructed with a plurality of flaps 13, formed by slitting the casing from an intermediate point 14 to the base flange 10 on each side of the partition member. As shown in the drawings, these slitted portions of the flap and partition are not only beveled as at 15 but are also flared outwardly toward the base, as shown in Fig. 2, so that when the flap is closed and clamped in place it fits snugly to the adjacent partitions and preserves the tire contour.

In cross-section, the outer casing is composed of an outer rubber tread 1 provided with inner layers of cord or heavy twine net interwoven with rubber 16 extending from the tread portion approximately midway to the base flanges on each side. Located in the tire flanges or beads 8 and 10 and adapted to give strength and resiliency to the outer shoe, are the spring members 22 and 23. As shown in cross-section, the former consists of a plate metal spring running circumferentially of the tire, while the other, 23, is curved in the middle to allow for the bus pipe 36, and it is also made in sections to allow for the upfolding of the tire flaps 13.

Circumferentially, the rim 5 is channeled, as at 35, to receive the air tube 36 which is provided with a single inflation valve 37 of the type ordinarily used in automobile or bicycle wheels. Preferably at the central portion of each section the rim 5 is recessed to receive the sectional valve mechanism, consisting of an L-shaped pipe 24 provided on its upper end with a rubber piece whereby it is made air-tight with the inner tube. On its lower end, the pipe 24 is constructed with a valve seat 39 on which seats the valve 40 provided with inwardly and outwardly projecting stems 41 and 42 having flat disk-like heads 43 and 44 thereon. Surrounding the stem 41 and taking between the head 43 and the valve seat is the spring 45 adapted to normally seat the valve. At the elbow the pipe 24 is provided with a closure nut 45′ whereby the valve device may be removed.

Externally, the pipe 24 is threaded to receive a second larger pipe 46 which is likewise threaded on the outside from a point midway thereof to the outer end which terminates in a flanged head 47 adapted to receive a nut 48.

The circumferential air bus pipe 36, at the junction with each sectional valve, is provided with a hollow bulged portion 49 and interiorly threaded, to receive transversely thereof the pipe 46 which latter is provided with openings 51 communicating with the bus pipe. Passing through the head 47 and nut 48 is a valve operating-stem 52 terminating within the pipe in an abutment head 53 for unseating the valve 40, and surrounding the stem 52 is a contractile spring 53′ adapted to hold the stem out of contact with the valve stem head 44.

At each sectional valve the rim 5 is apertured, to provide access to the valve operating stem 52, and each aperture is provided with a closing device of any desired form, herein illustrated as a sliding door 56 having a latch 57.

As shown in Fig. 2, the base of the casing flap 13 is cut away, as at 58, to permit the same to fit around the upper leg of the L-shaped pipe 24.

As shown in Fig. 4, the base flanges or beads 8 and 10 are carried all the way across the base at the partition and form a solid flange, whereas between partitions the flanges are separated by a space to permit the insertion of the L-shaped pipe 24.

As shown in Fig. 5, the rim 5 is recessed in a stepped formation, so that the bottom of the rim recess will act as a guide to assist in alining the pipe sections 24 and 46 during their assembling.

In order to pump up the tire, the source of air pressure is attached to the main valve 37 and the air entering the bus pipe 36 passes into each sectional valve through the slots 51, forcing back the valves 40 and inflating the individual sectional inner tubes.

In case one section becomes punctured, the remaining sections will be unaffected, and when the punctured inner tube collapses, the adjacent partition members of the interwoven rubber and heavy twine or cord will not only operate to assist the adjacent sections which are filled with air to support the punctured section, but will permit the same to yield as required. In other words, these partition members are both tensible and flexible.

When it is desired to replace the inner tube, the clamping bolts 12 and clamps 11 of the particular section are removed, the flap folded back whence access may be had to the inner tube thereof.

In some instances it may be found expedient to let the air out of the adjacent sections before removing the punctured inner tube, in which case, by pressing inwardly the stems 52 of the adjoining sections, the valves thereof are opened and the air allowed to escape and this collapsing of these additional sections is effected without disturbing the remaining inner tubes, since each section acts as a unit.

A tire constructed as set forth has many advantages over the present single inner tube device, in that it may be run on a flat section for considerable distance without injury thereto since the remaining sections together with the partition stiffening means preserve the contour of the tire and prevent it from collapsing.

Further, the tire can be changed without the usual delay and bother of jacking up the wheel, or without removing the tire, nor does it require so much pumping to reinflate the new section since the air will not be directed to the sections already inflated, but will pass directly to the section to be pumped up filling the same until the pressure therein is equal to the pressure of the other sections. The air from any particular section can be released without affecting the others.

Having thus described my invention, what I claim as new and desire to secure by Letters Patent is:

1. The combination of a rim, a casing thereon, a series of inner tube sections adapted to be held in said casing, an annular inflating conduit mounted in said rim and provided with an air inlet, a plurality of conduits in said rim each communicating with a section and passing through said annular conduit and communicating therewith, a normally seated valve in each conduit and means therein adapted to be operated from the side of the rim for operating each valve to deflate each section.

2. The combination of a rim, a casing thereon, sectional inner tubes in said casing, an inflating conduit in said rim communicating with each section, including means for independently deflating each section projecting through the rim and means for preventing accidental operation of the deflating means.

3. In combination, a rim, a casing thereon, sectional inner tubes in said casing, an annular inflating conduit mounted in said rim, sleeves threaded therethrough and perforated to communicate therewith, valve tubes connected with each tire section and provided with inner threaded ends to thread into said sleeve, valves mounted in said tubes, and rods operatively mounted in said sleeves and adapted to be projected against said valves to unseat said valves to deflate each section independently.

4. The combination of a rim, a casing thereon, sectional inner tubes in said casing, an annular inflating-conduit in said rim, a plurality of auxiliary conduits, each passing through said inflating-conduit and communicating therewith and with the corresponding tube, a normally-closed valve in each auxiliary conduit openable by air-pressure from said inflating-conduit to inflate the tubes, and deflating-means for opening any one of said valves for deflation of the corresponding tube.

5. The combination of a rim, a casing thereon, sectional inner tubes in said casing, an annular inflating-conduit in said rim, and a plurality of auxiliary conduits, each passing through said inflating-conduit and communicating therewith and with the corresponding tube, said inflating-conduit being provided with bulged portions at the points where said auxiliary conduits pass therethrough, each bulge forming a chamber between said inflating-conduit and the corresponding auxiliary conduit.

In testimony whereof I affix my signature in the presence of two witnesses.

WILLIAM EATON PERRYCLEAR.

Witnesses:
W. R. WOOD,
L. W. HIGH.